(12) United States Patent
Tian et al.

(10) Patent No.: US 8,588,772 B2
(45) Date of Patent: Nov. 19, 2013

(54) CIRCUIT SWITCH FALLBACK (CSFB) DURING PREPAGING

(75) Inventors: Lu Tian, Plano, TX (US); Yong Zhao, Plano, TX (US)

(73) Assignee: Alcatel Lucent, Paris (FR)

( * ) Notice: Subject to any disclaimer, the term of this patent is extended or adjusted under 35 U.S.C. 154(b) by 0 days.

(21) Appl. No.: 13/413,752

(22) Filed: Mar. 7, 2012

(65) Prior Publication Data

US 2013/0237213 A1 Sep. 12, 2013

(51) Int. Cl.
H04W 4/00 (2009.01)
H04M 3/42 (2006.01)
H04L 12/26 (2006.01)
H04L 12/66 (2006.01)

(52) U.S. Cl.
USPC ..... 455/432.1; 455/417; 455/415; 455/414.1; 370/220; 370/221; 370/331; 370/354

(58) Field of Classification Search
USPC ............ 455/432.1, 417, 415, 414.1; 370/220, 370/221, 331, 354
See application file for complete search history.

(56) References Cited

U.S. PATENT DOCUMENTS

| 2001/0023183 | A1* | 9/2001 | Palviainen et al. | 455/417 |
| 2007/0232280 | A1* | 10/2007 | Pruser et al. | 455/414.1 |
| 2009/0209252 | A1* | 8/2009 | Han et al. | 455/433 |
| 2010/0098023 | A1* | 4/2010 | Aghili et al. | 370/331 |
| 2011/0081907 | A1* | 4/2011 | Yang et al. | 455/433 |
| 2011/0092196 | A1* | 4/2011 | Stojanovski et al. | 455/418 |
| 2011/0189983 | A1* | 8/2011 | Tanaka | 455/415 |
| 2012/0069731 | A1* | 3/2012 | Tooher et al. | 370/221 |
| 2012/0120789 | A1* | 5/2012 | Ramachandran et al. | 370/220 |
| 2012/0190351 | A1* | 7/2012 | Tian et al. | 455/417 |
| 2012/0302234 | A1* | 11/2012 | Wallis et al. | 455/433 |

FOREIGN PATENT DOCUMENTS

| EP | 2285157 | 2/2011 |
| WO | 2011120030 | 9/2011 |

OTHER PUBLICATIONS

KT; CSFB Pre-Paging Scheme to Improve CSFB Voice Services; 3GPP Draft; C1-114523 CSFB Pre-Paging; 3rd Generation Partnership Project (3GPP); Mobile Competence Centre; 650, Route Des Lucioles; F-06921 Sophia-Antipolis Cedex; France, vol. CT WG1, No. San Francisco (CA); USA; 20111114-20111118; Nov. 7, 2011; XP050555522; [retrieved on Nov. 7, 2011].

(Continued)

*Primary Examiner* — Meless N Zewdu
*Assistant Examiner* — Jean Chang
(74) *Attorney, Agent, or Firm* — Carmen Patti Law Group, LLC

(57) ABSTRACT

A method and apparatus for delivering a mobile terminated call to user equipment (UE) in a circuit switched fallback (CSFB) capable wireless network system using prepaging. When the VMSC registered in the HLR of the called UE receives a provide roaming number message from the HLR indicating that a CS call to the UE has been originated at a GMSC, the VMSC starts a paging process with a mobility management entity (MME) then returns a mobile station roaming number (MSRN) to the HLR when the called UE is in EMM-connected mode. Alternatively, the VMSC sets a guard timer and returns the MSRN to the HLR when the guard timer expires. In the meantime, the VMSC remain in a paging stage waiting for the response from the UE falling back to the UMTS/GSM network from the LTE network.

23 Claims, 11 Drawing Sheets

(56) References Cited

OTHER PUBLICATIONS

Zte et al; Mobile Terminating Roaming Forwarding for Pre-Paging; 3GPP Draft; C4-111418 was C4-111229-23018 (MTRF for Prepaging), 3rd Generation Partnership Project (3GPP), Mobile Competance Centre; 650, Route Des Lucioles; F-06921 Sophia-Antipolis Cedex; France, vol. CT WG4, No. Tallinn; 20110509; May 17, 2011; XP050532746; [retrieved on May 17, 2011].

3RD Generation Partnership Project; Technical Specification Group Services and System Aspects; Circuit Switched (CS) Fallback in Evolved Packet System (EPS); Stage 2 (Release 10); 3GPP Standard; 3GPP TS 23.272, 3rd Generation Partnership Project (3GPP), Mobile Competence Centre; 650, Route Des Lucioles; F-06921 Sophia-Antipolis Cedex; France, vol. SA WG2, No. V10.6.0, Dec. 14, 2011; pp. 1-81; XP050554514; [retrieved on Dec. 14, 2011].

* cited by examiner

CIRCUIT SWITCH FALLBACK (CSFB) DURING PREPAGING

FIELD OF THE INVENTION

The invention relates generally to wireless communication systems and more particularly to the handling of mobile terminated calls in a system that provides Circuit Switch Fallback (CSFB) during prepaging.

BACKGROUND

Today's wireless telecommunications networks provide telephone subscribers with the ability to access telecommunications services from almost anywhere in the world. The key to facilitating such world-wide access is mobility management. With mobility management, wireless networks are able to track the location of mobile stations so that mobile services can be delivered to them.

Wireless networks are currently transitioning from an architecture referred to as Third Generation (3G) to a 4G (Fourth Generation) architecture, commonly known as LTE (Long Term Evolution). Each of these architectures have different mobile devices, or user equipment (UE), as well as different network devices that provide wireless service for the UEs. As the transition from 3G to LTE is implemented, it is necessary to provide a system for delivering 3G CS calls for LTE UEs which are CS capable. This call delivery occurs via a combination of 3G and LTE network devices. This system is commonly called Circuit Switched Fallback (CSFB).

A 3G CS wireless network is typically formed of a number of cells, each covering a small geographic area within which a UE, may receive mobile services. Each cell is equipped with a base station that provides radio coverage to the cell, thereby enabling communication with UEs located within the cell. By integrating the coverage of multiple base stations, a wireless network is able to provide radio coverage to mobile stations over a large geographic area.

The coverage area of a collection of neighboring base stations in a 3G wireless network is commonly referred to as a location area each served by a mobile switching center (MSC). The MSC is the network node that provides circuit-switched calling, mobility management and other telecommunications/mobile services to UEs. In particular, the MSC maintains subscriber data for all UEs that are currently located within one of the location areas served by the MSC. UE subscriber data is permanently maintained in a home location register (HLR) within the wireless network. When the UE is within the range of an MSC, that MSC acquires a copy of the UE subscriber data from the HLR and maintains it in a visiting location register (VLR). The location area of the UE is also maintained in the visiting location register (VLR) for the MSC to page the UE in the location area for a mobile termination call. An MSC that is associated with the current location area of a UE is referred to as a visiting mobile switching center (VMSC) relative to the mobile station. The MSC receiving a call that is intended for the UE subscriber is referred to as a gateway mobile switching center (GMSC).

When a call from a calling UE is received at a GMSC, the HLR of the called UE is consulted to see what VMSC is currently serving the called UE, then the HLR requests a roaming number from the VMSC using a Provide Roaming Number (PRN) message. The VMSC provides a roaming number to the HLR with a PRN Acknowledge message. The GMSC uses the roaming number, received from the HLR, to send an Initial Address Message (IAM) to the VMSC after which the VMSC pages the called UE. When the called UE is an LTE device, the VMSC sends the paging request to a mobile management entity (MME) which is responsible for managing tracking and paging procedures in the LTE wireless network. When a 3G CS call for a called LTE UE originates in a 3G network, the interaction between 3G network devices such as MSCs and LTE network devices like the MME is managed by a set of procedures using CSFB.

Normally, the call setup procedure described above results in a call path being set up through the wireless network to the termination MSC and then the UE is paged. In some circumstances, this call path may turn out to have been unnecessary if the UE does not accept the call, resulting in inefficient use of network resources.

One solution to this situation in the prior art is prepaging, where the UE is paged during the PRN procedure, i.e., before the VMSC returns the PRN Ack message the GMSC. Unfortunately, prepaging does not work with CSFB.

Therefore, what is needed is a procedure for performing CSFB signaling in a wireless network with prepaging.

SUMMARY

Embodiments of the present invention disclose a method and apparatus for providing circuit switched fallback during prepaging in a wireless network.

In one embodiment, there is provided a method for delivering a mobile terminated call from a calling user equipment (UE) to a called UE over a wireless network, which includes the steps of receiving a provide roaming number (PRN) message from a home location register (HLR) associated with the called UE when the mobile terminated call is originated, sending a paging request to a mobility management entity (MME) said paging request causing said MME to start paging the called UE, receiving a SGs service request message from the MME indicating the called UE is in EMM-connected mode and sending a mobile station roaming number (MSRN) to the HLR in a PRN acknowledge (PRN Ack) message before receiving a response in the 3G network to the paging request from the called UE.

Some embodiments of the above method further include wherein the PRN Ack message is sent as soon as the paging request is acknowledged by the MME.

Some embodiments of any of the above methods further include wherein, if the called UE does not answer the call a call forwarding process is initiated as soon as the IAM is received.

Some embodiments of any of the above methods further include wherein, if the called UE rejects the paging request, a call forwarding process is initiated as soon as the IAM is received.

Some embodiments of any of the above methods further comprise the step of setting a guard timer when the SGS service request message from the MME is received and sending the PRN Ack message after the guard timer expires.

Some embodiments of any of the above methods further include wherein, if the called UE does not answer the call by the time the guard timer expires, a PRN nack ("absent subscriber"/"no answer") message is sent to the HLR and a call forwarding process is initiated.

Some embodiments of any of the above methods further include wherein, if the called UE rejects the paging request before the guard time expires, a PRN nack ("absent subscriber"/"user busy") message is sent to the HLR and a call forwarding process is initiated.

Some embodiments of any of the above methods further include wherein the called UE is an LTE (Long Term Evolution) device, the mobile terminated call originates from a circuit-switched network and the step of sending a paging request further comprises sending a circuit-switched page to an LTE radio in the mobile device.

Some embodiments of any of the above methods further include wherein the wireless network includes a mobile termination roaming forwarding feature.

In another embodiment, there is provided a method for providing CSFB operation during prepaging when delivering a mobile terminated call from a calling 3G CS user equipment (UE) to a called LTE UE including the steps of receiving a provide roaming number (PRN) message from a home location register (HLR) associated with the called LTE UE when the mobile terminated call is originated at a gateway mobile switching center (GMSC), sending a paging request to a mobility management entity (MME), said paging request causing said MME to start paging the called LTE UE, receiving a SGs service request message from the MME and sending a mobile station roaming number (MSRN) to the HLR in a PRN acknowledge (PRN Ack) message before completion of the paging process.

Some embodiments of the above method further include wherein the PRN Ack message is sent as soon as the paging request is acknowledged by the MME with the SGs service request message, and an initial address message (IAM) is received from the GMSC independently of the completion of the paging process.

Some embodiments of any of the above methods further include wherein a call forwarding no reply (CFNRy) timer is started in response to the SGs service request message indicating the called LTE UE is in EMM-connected mode, and if the called LTE UE does not answer the call before the timer expires, a call forwarding process is initiated as soon as the IAM is received from the GMSC.

Some embodiments of any of the above methods further include wherein, if the called LTE UE rejects the paging request with a SGs paging reject message, a call forwarding process process is initiated as soon as the IAM is received from the GMSC.

Some embodiments of any of the above methods further comprise the steps of setting a guard timer when the SGs service request message from the MME is received and sending the PRN Ack message when the guard timer expires.

Some embodiments of any of the above methods further include wherein a call forwarding no reply (CFNRy) timer is started in response to the SGs service request message indicating the called LTE UE is in EMM-connected mode, and if the called LTE UE does not answer the call before the CFNRy guard timer expires, a PRN nack ("absent subscriber"/"no answer") message is sent to the HLR and a call forwarding process is initiated.

Some embodiments of any of the above methods further include wherein, if the called LTE UE rejects the paging request with a SGs paging reject message before the guard time expires, a PRN nack ("absent subscriber"/"user busy") message is sent to the HLR and a call forwarding process is initiated.

Some embodiments of any of the above methods further include wherein the wireless network includes a mobile termination roaming forwarding feature.

In another embodiment, there is provided an apparatus for use in a telecommunications network for delivering a mobile terminated call from a calling UE to a called UE, said apparatus configured to perform the following steps: receiving a provide roaming number (PRN) message from a home location register (HLR) associated with the called UE when the mobile terminated call is originated, sending a paging request to a mobility management entity (MME) said paging request causing said MME to start paging the called UE, receiving a SGs service request message from the MME and sending a mobile station roaming number (MSRN) to the HLR in a PRN acknowledge (PRN Ack) message before receiving a response to the paging request from the called UE.

Some embodiments of the above apparatus may further include wherein the PRN Ack message is sent as soon as the paging request is acknowledged by the MME.

Some embodiments of the above apparatus may further include wherein, if the called UE does not answer the call or rejects the paging request, a call forwarding process is initiated as soon as the IAM is received.

Some embodiments of the above apparatus may be further configured to perform the steps of setting a guard timer when the SGS service request message from the MME is received and sending the PRN Ack message after the guard timer expires.

Some embodiments of the above apparatus may further include wherein, if the called UE does not answer or rejects the call by the time the guard timer expires, a PRN nack message is sent to the HLR and a call forwarding process is initiated.

Some embodiments of the above apparatus may further include wherein the called UE is an LTE (Long Term Evolution) device, the calling UE is a 3G device and the sending a paging request step further comprises the step of sending a circuit-switched page to an LTE radio in the called UE.

DESCRIPTION OF THE DRAWINGS

Features of example implementations of the invention will become apparent from the description, the claims, and the accompanying drawings in which:

DETAILED DESCRIPTION

Wireless networks around the world are in the process of updating from third generation (3G) networks to Long Term Evolution (LTE, also known as 4G) networks. Until LTE networks and user equipment fully support voice services directly over LTE, the user equipment (UE) must be capable of performing the Circuit-Switched FallBack (CSFB) procedures so that LTE UE is reachable for mobile-terminated circuit-switched calls. In particular, the LTE network includes a mobile management entity (MME) that is configured to receive paging requests from 3G VMSCs and pass them to LTE UEs. When a mobile terminated call is received by a GMSC in a 3G network for a UE currently camped on LTE, the mobile station normally receives a circuit-switched page request from the MME, which received it from the VMSC in the 3G network.

Prepaging is a solution used in 3G networks to provide more efficient use of network resources. Before prepaging, a GMSC receiving notification of a mobile-terminated call to a UE would request a roaming number via the HLR from a VMSC. Once the roaming number was received, the GMSC would forward an initial address message (IAM) to the VMSC, which would then page the called UE. After the paging process was completed, the VMSC would complete the call. However, if the UE did not accept the call for some reason, for example, the UE was already engaged in another call or was out of the coverage area of the VMSC, then exchange of roaming number messages was wasted.

Prepaging addressed this issue by causing the VMSC to send a page to the UE before sending a roaming number back to the GMSC. In situations where the paging process was completed before the roaming number is sent, additional information could be included in the roaming number message (PRN Ack). If the PRN Ack message was sent before paging was completed, the IAM message from the GMSC would be available at the VMSC as soon as paging was completing, thus still providing more efficient use of network resources.

As part of the transition from 3G to LTE networks, it is necessary to provide a procedure for handling prepaging in a CSFB situation.

Figure 11:
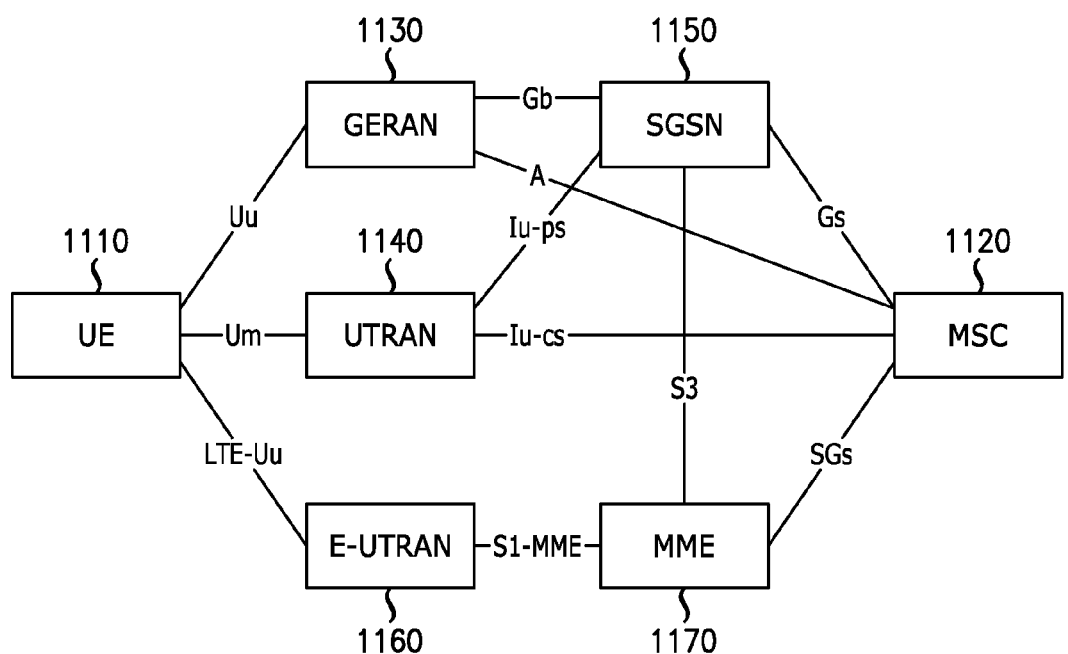
FIG. 11 is a block diagram illustrating an Evolved Packet System (EPS) architecture used for Circuit Switched Fallback.

FIG. 11 is a block diagram illustrating an exemplary wireless network having both 3G and LTE devices, in accordance with embodiments of the present invention. User equipment 1110 is connected to the 3G network MSC 1120 via 3G User Terrestrial Radio Access network (UTRAN) 1140 or 2G GSM EDGE Radio Access Network (GERAN) 1130 and Serving GPRS Support Node (SGSN) 1150. Alternatively, User Equipment 1110 is also connected to Mobile Management Entity (MME) 1170 via the LTE network of Evolved-UTRAN (E-UTRAN) 1160. The labels on the lines between elements refer to interface protocols used between the two elements and would be understood to one of ordinary skill in the art. If the UE 1110 is connected to MME 1170, for the CS call the UE 110 will fall back to the 2G/3G network.

Figure 1:
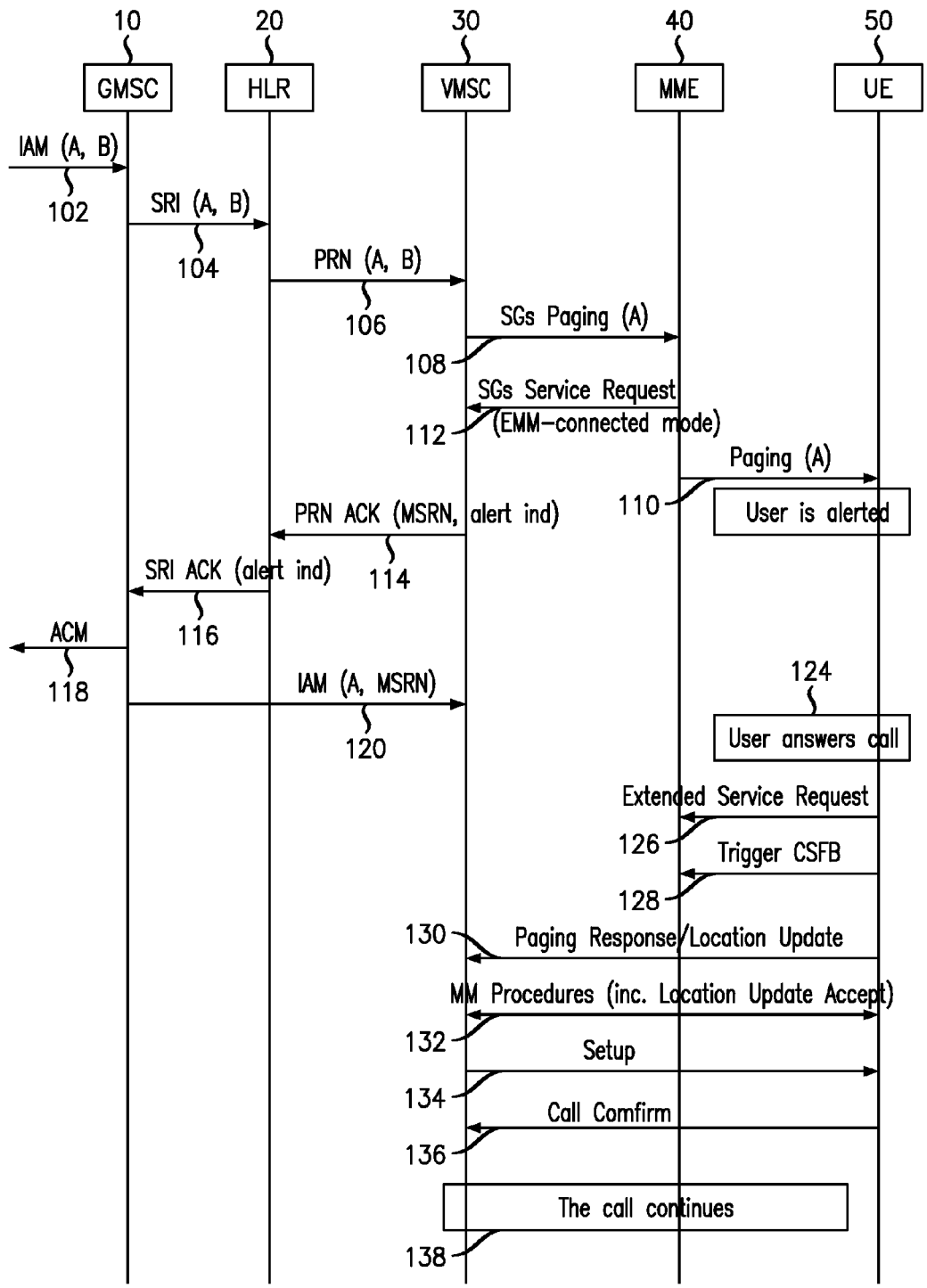
FIG. 1 is a diagram illustrating a normal case of CSFB during prepaging without a guard timer.

FIG. 1 shows a first embodiment of a system for providing CSFB during prepaging. initial address message (IAM(A,B), where A denotes the calling party number (CLI) and B denotes the called party number) 102, sending routing info (SRI) 104 and provide roaming number (PRN) 106 messages are sent. One feature of this embodiment is that the home location register (HLR) 20 is required to include the calling line id in PRN 106. In response to PRN 106, VMSC 30 performs CLIP (Calling Line Identification Presentation) then sends a paging request 108 to MME 40 using a SGs interface. When UE 50 is paged, VMSC 30 returns a mobile station roaming number (MSRN) to HLR 20 in a PRN ACK message 114 and remains in a paging stage waiting for the response via UTRAN 1140 or GERAN 1130 from the UE 1110. If UE 50 is in EMM-connected mode (EPS Mobility Management) as indicated SGs Service Request 112, VMSC 30 also includes an alerting indicator in the PRN ack. HLR 20 sends SRI ACK 116 to GMCS 10 which then sends address complete message (ACM) 118 to the calling UE. When the MSRN is received from the HLR in SRI 104, GMSC 10 plays a ring back tone to the calling UE and routes the call to the VMSC 30 at 120. GMSC 10 is only able to play a ring back tone to the calling party if an alerting indicator is included in the PRN ACK 114 and SRI ACK 116 messages. If HLR 20 and GMSC 10 have not been upgraded to include this feature, the ring back tone is not played unless other ring back tone features apply.

When the user answers the call at 124, the call is delivered normally as shown in steps 126-138. These steps would be understood by one of ordinary skill in the art.

Figure 2:
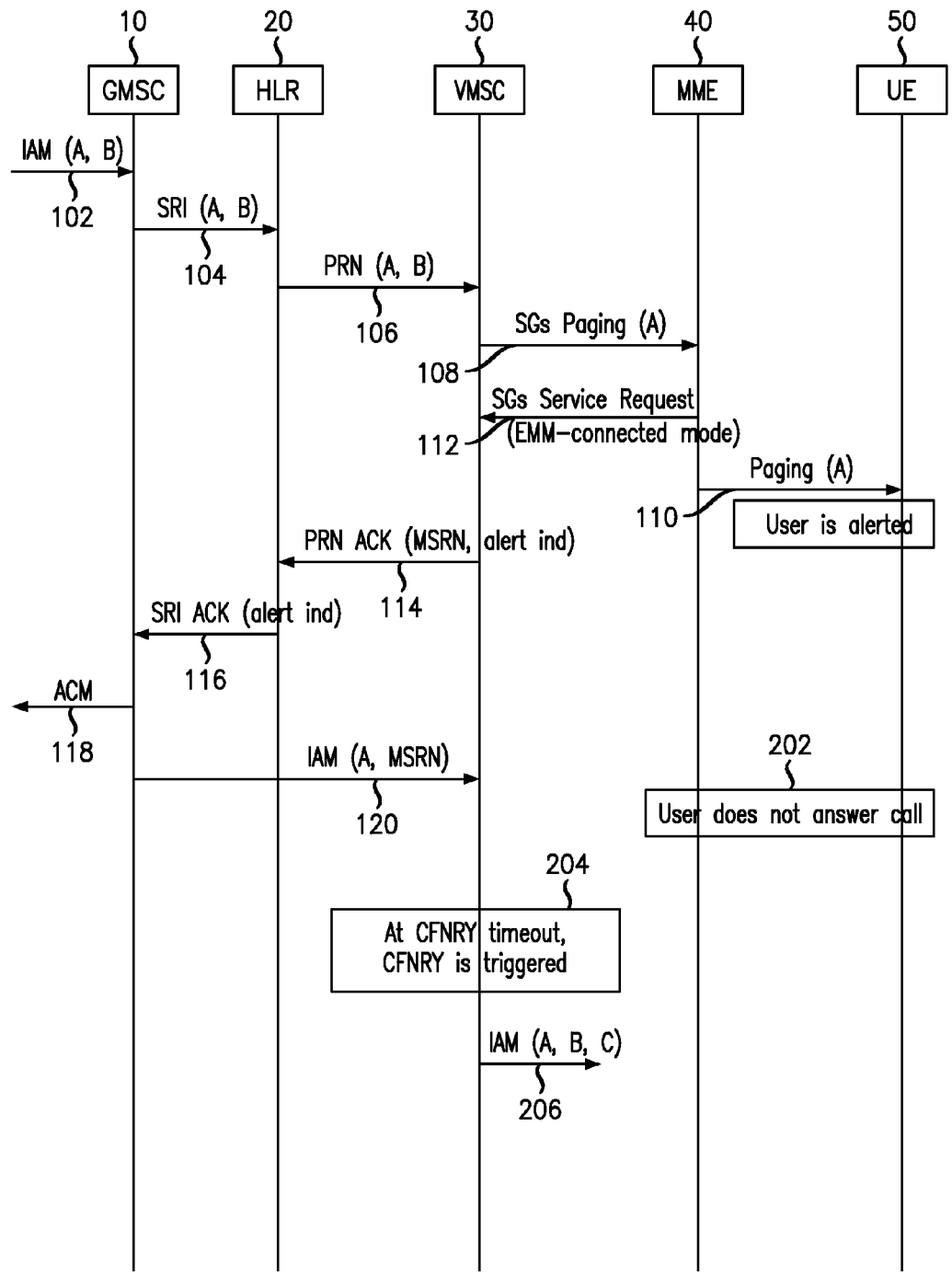
FIG. 2 is a diagram illustrating the embodiment of FIG. 1 when a UE does not answer a call, the CFNRy case.

The embodiment shown in FIG. 2, illustrates the operation of the first embodiment in the case where UE 50 does not answer the call. Signals 102-120 are as described for FIG. 1. In this embodiment, the called UE does not answer the call at 202. In all cases, when VMSC 30 receives a SGs Service Request (EMM-connected mode) message 112, it starts a Call Forwarding on No Reply (CFNRy) timer (if CFNRY is active in the network). If the timer expires at 204 before a response to the page is received, VMSC 30 triggers the CFNRy procedure after the call is received from GMSC 10 and forwards the IAM to the appropriate location at 206. The CFNRy procedure would be understood by one of ordinary skill in the art.

Figure 3:
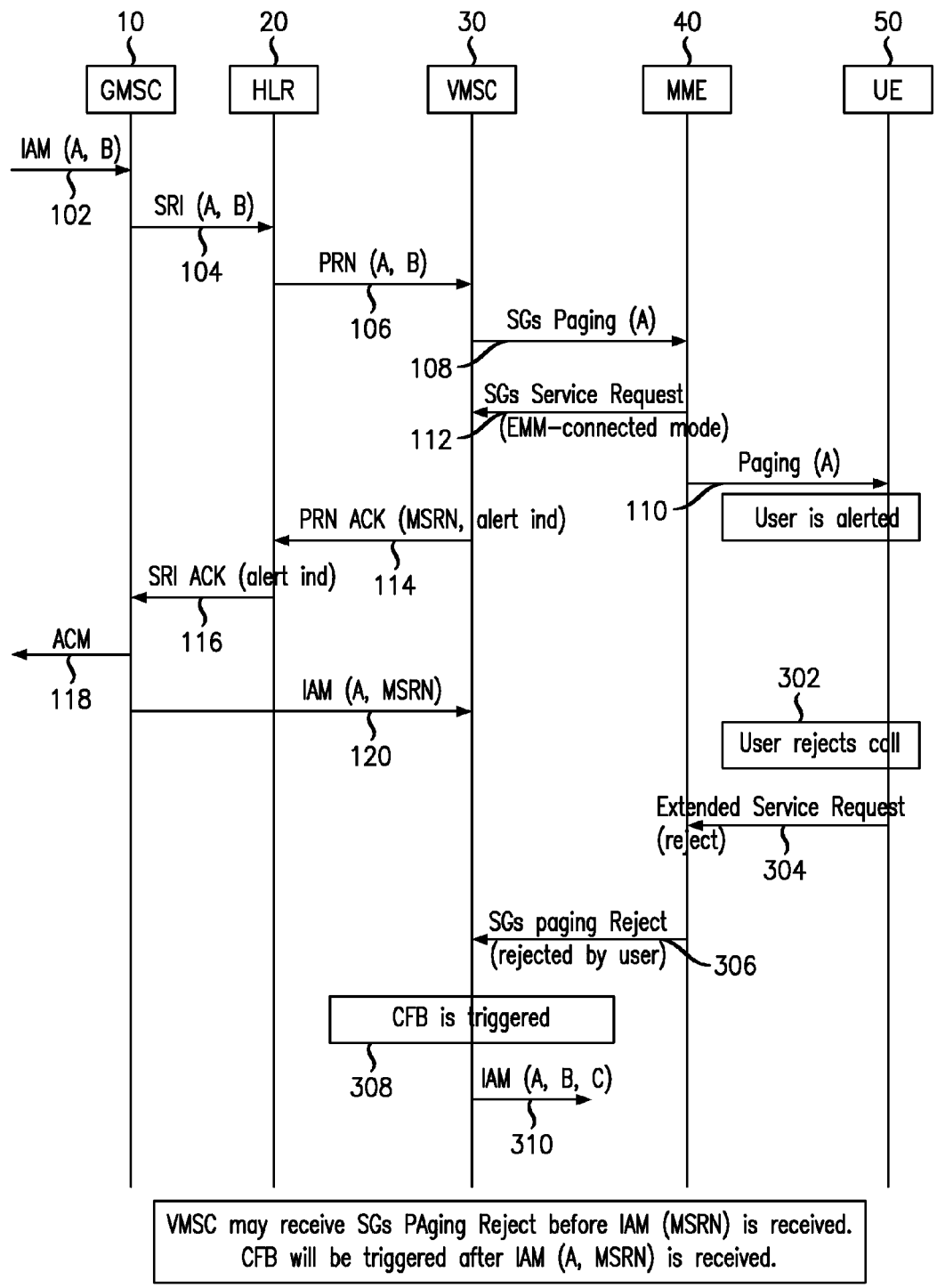
FIG. 3 is a diagram illustrating the embodiment of FIG. 1 when a UE rejects a call, the CFB case.

The embodiment shown in FIG. 3 illustrates the operation of the first embodiment in the case where UE 50 rejects the call. In this case, after signals 102-120 are exchanged as explained for FIG. 1, UE 50 rejects the call at 302 by sending an Extended Service Request(reject) message 304 to MME 40. A SGs Paging Reject message 306 is sent from MME 40 to VMSC 30. If VMSC 30 has already returned an MSRN to HLR 20, VMSC 30 then triggers CFB (Call Forwarding on Mobile Subscriber Busy) if this is active in the network at 308 after the call is received from GMSC 10 at 120 and forwards the IAM to the appropriate location at 310. The CFB procedure would be understood by one of ordinary skill in the art.

Figure 4:
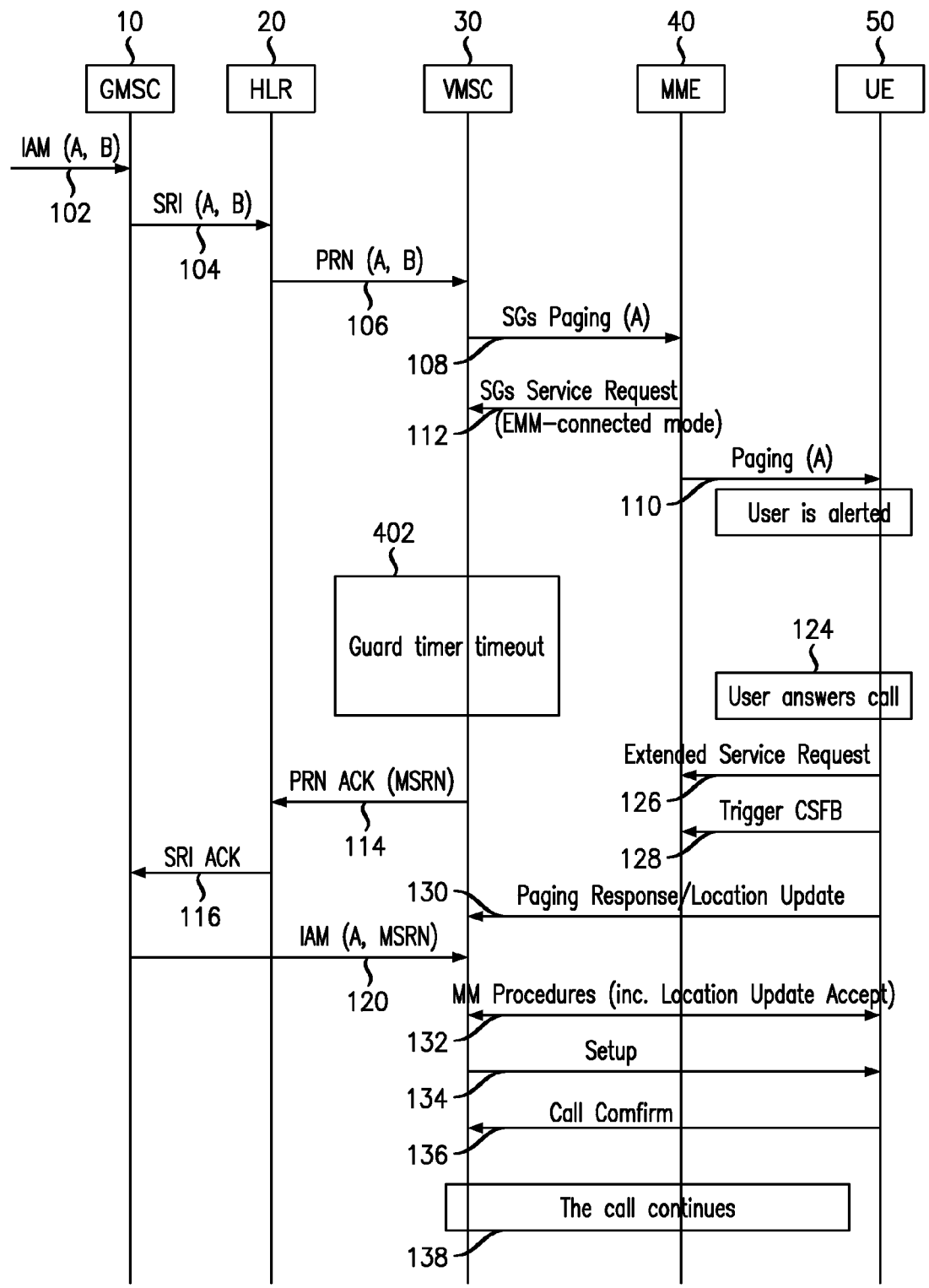
FIG. 4 is a diagram illustrating a normal case of CSFB during prepaging with a guard timer.

A second embodiment is shown in FIG. 4. In this embodiment a guard timer is used in VMSC 30 to monitor the paging process. The length of the guard timer may be flexibly set by an operator but in a preferred embodiment, the guard timer is set for 20 seconds or a period shorter the Mobile Application Part (MAP) timers in HLR 20 and in GMSC 10. Steps 102-110 are the same as the first embodiment shown in FIG. 1. In this embodiment, VMSC 30 waits for the guard timer to timeout at 402 then sends PRN ACK message 114 with a MSRN to HLR 20. VMSC 30 remains in the paging stage waiting for the response via UTRAN 1140 or GERAN 1130 from the UE 1110 while HLR 20 sends SRI ACK 116 to GMSC 10 which responds by sending IAM 120 to VMSC 30. In the normal case where UE 50 answers the call, it is delivered as shown in steps 126-138. These steps would be understood by one of ordinary skill in the art.

Figure 5:
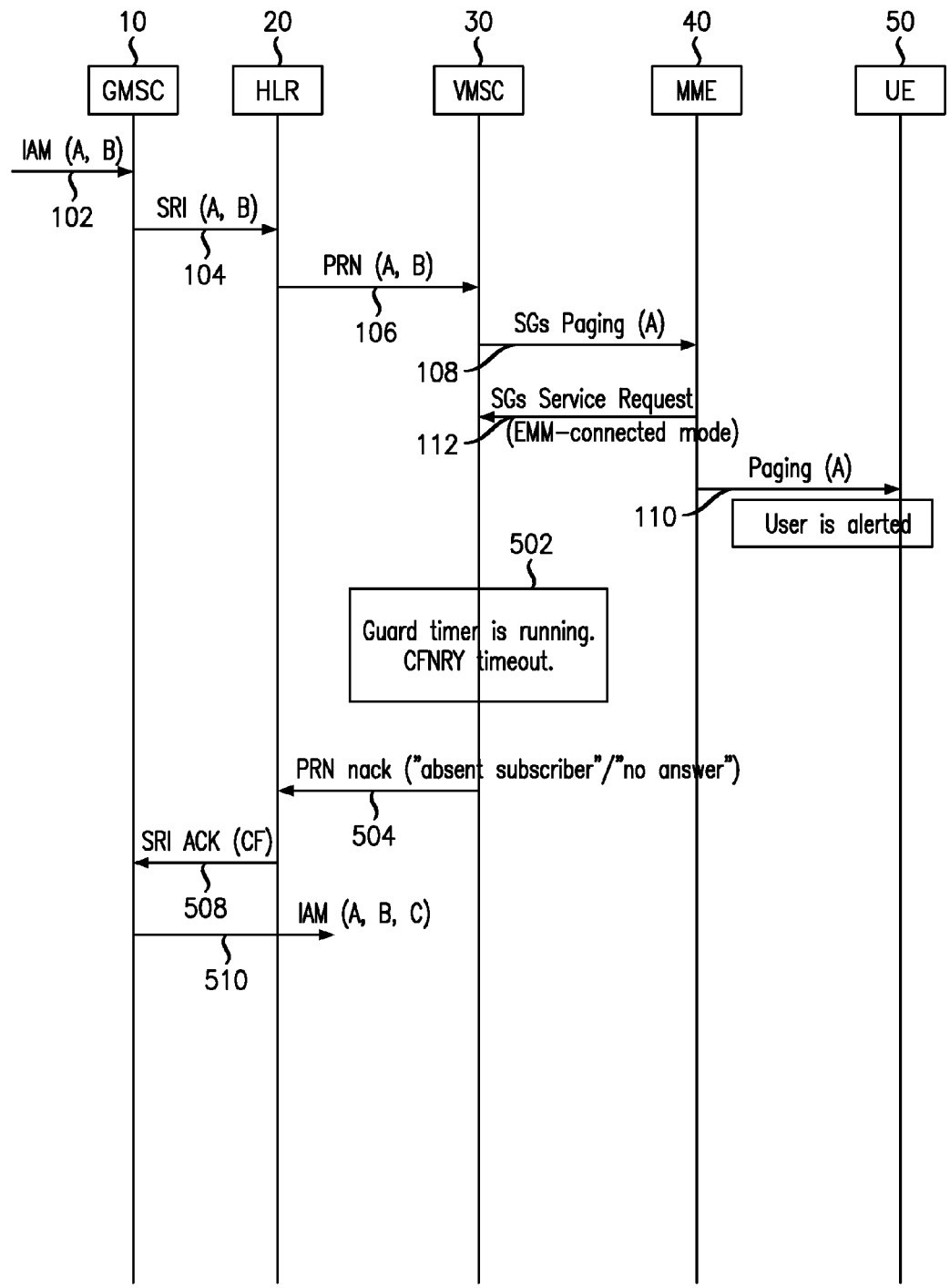
FIG. 5 is a diagram illustrating the embodiment of FIG. 4 when a UE does not answer a call, the CFNRy case.

The embodiment shown in FIG. 5, illustrates the operation of the second embodiment in the case where UE 50 does not answer the call. In this case, when the CFNRy timer times out while the guard timer is still running at 502, a PRN nack ("absent subscriber"/"no answer") 504 is sent to HLR 20. An SRI ACK (CF) message 508 is sent from HLR 20 to GMSC 10, triggering a CFNRy operation at 510 if active. If HLR 20 or GMSC 10 are not upgraded to include this feature, HLR 20 may trigger Call Forwarding not Reachable (CFNRc) if active.

Figure 6:
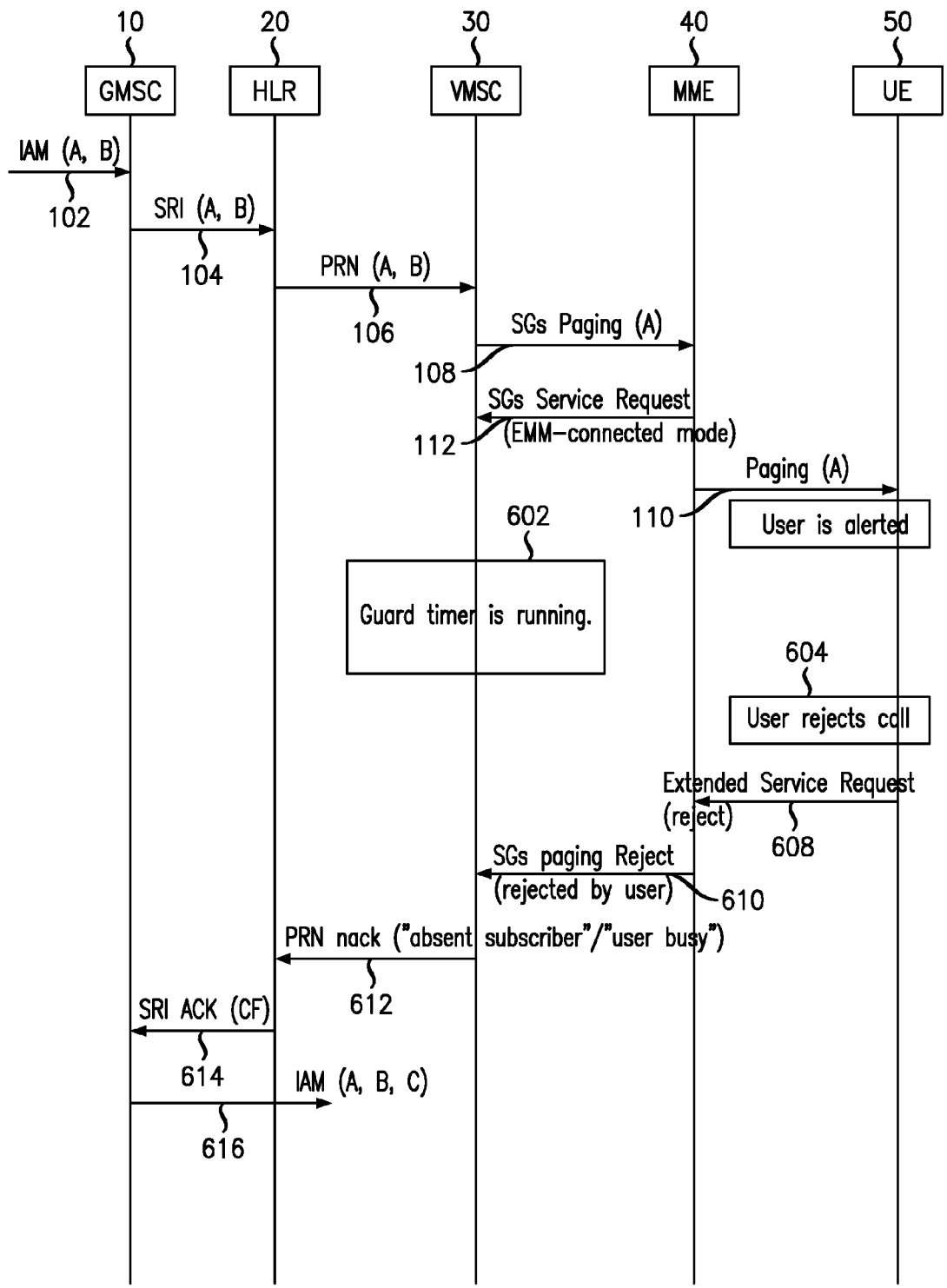
FIG. 6 is a diagram illustrating the embodiment of FIG. 4 when a UE rejects a call.

The embodiment shown in FIG. 6 illustrates the operation of the second embodiment in the case where UE 50 rejects the call while the guard timer is still running at 602. UE 50 rejects the call at 604 and sends Extended Service Request(reject) 608 to MME 40 which sends SGs Paging Reject (rejected by user) 610 to VMSC 30. A PRN nack ("absent subscriber"/ "user busy") message 612 is sent to HLR 20 which then sends SRI ACK (CF) 614 to GMSC 10. This triggers a call forwarding on user busy operation at 616 if active. If HLR 20 or GMSC 10 are not upgraded to include this feature, HLR 20 may trigger Call Forwarding not Reachable (CFNRc) if active.

In all of the cases illustrated in FIGS. 2, 3, 5 and 6, the "no answer" or "user busy" event may occur after VMSC 30 has returned an MSRN to HLR 20 but before the call (IAM) is received from GMSC 10. In this case VMSC 30 waits for the call then triggers Call Forwarding (CFNRy, CFB or CFNRC) if active.

Figure 7:
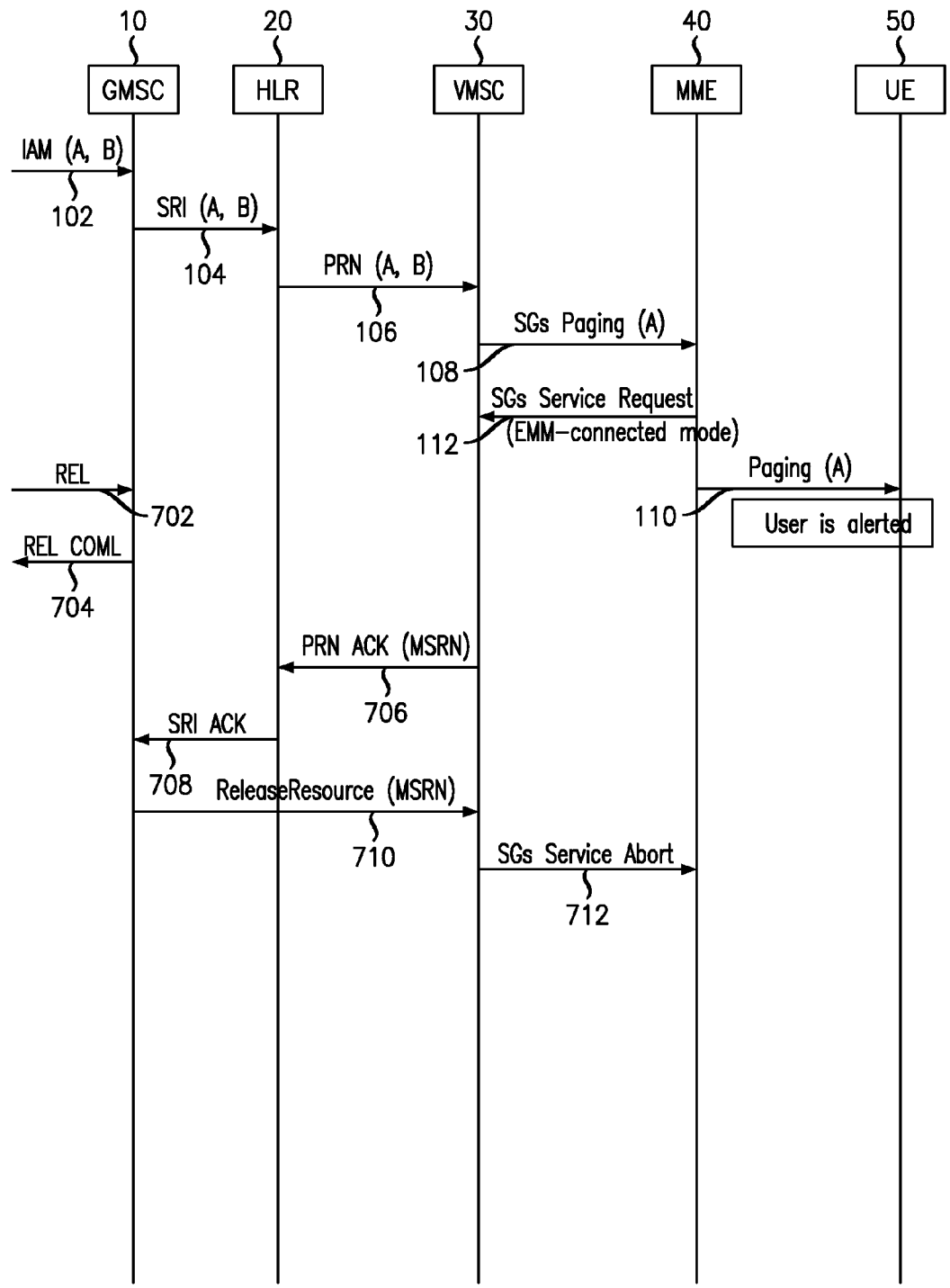
FIG. 7 is a diagram illustrating an embodiment where a calling UE releases a call before a VMSC sends a roaming number.

FIG. 7 shows a case applicable to either the first or second embodiments where the calling UE releases the call at 702 before VMSC 30 sends PRN ACK 706. In this case, when HLR 20 sends SRI ACK 708 to GMSC 10, GMSC 10 sends ReleaseResource(MSRN) 710 to VMSC 30, which then sends SGs Service Abort 712 to MME 40.

Figure 8:
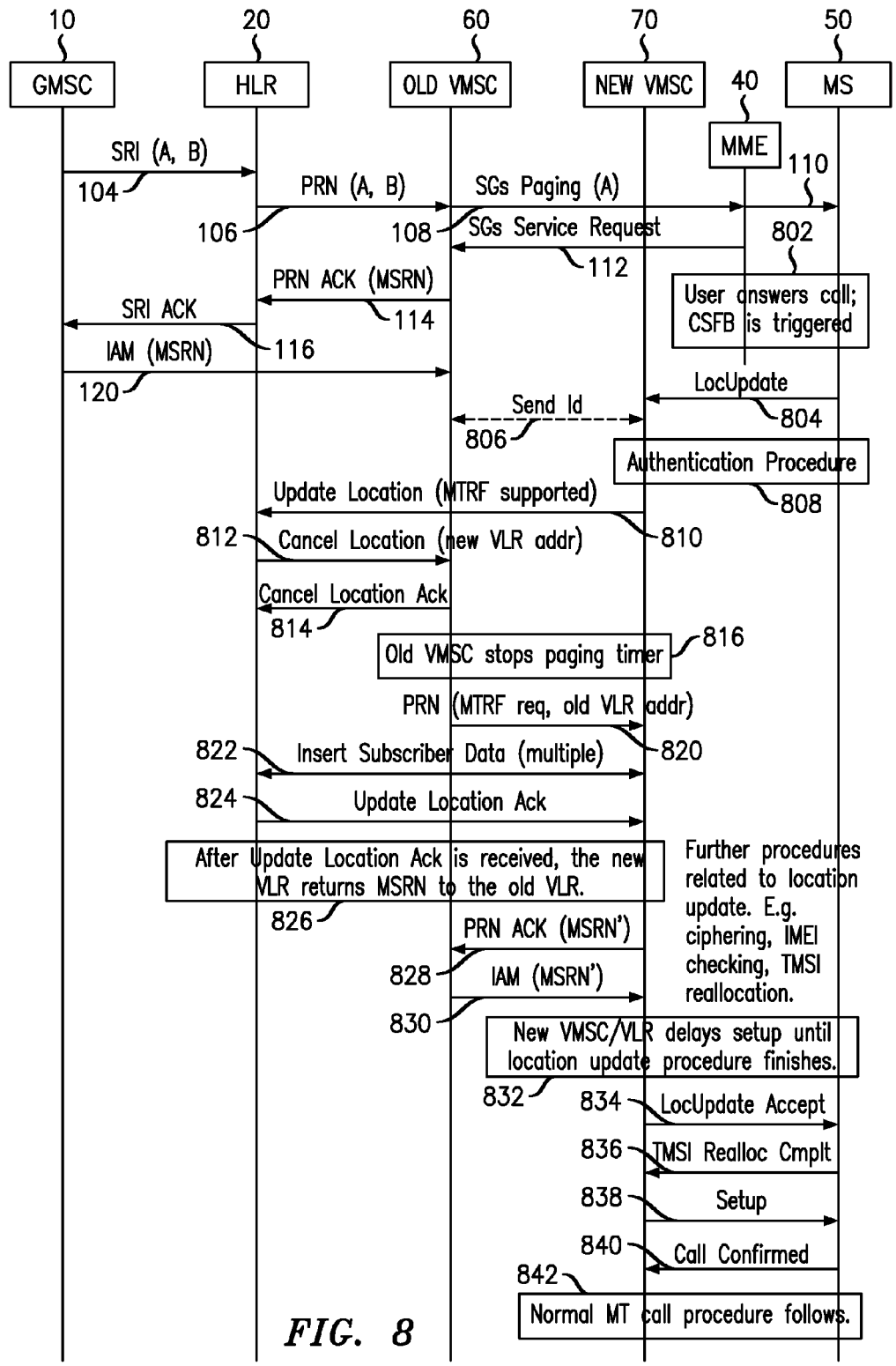
FIG. 8 is a diagram illustrating an embodiment of CSFB during prepaging in a system that uses MTRF when a Cancel Location message is received after the call is received.

FIG. 8 shows a third embodiment for use in a wireless network which is upgraded to include the Mobile Termination Roaming Forwarding (MTRF) feature. MTRF is described in more detail in co-pending U.S. application Ser. No. 13/350,918 filed on Jan. 16, 2012 titled Mobile Termination Roaming Forwarding. In FIG. 8, the paging VMSC is old VMSC 60 and immediately sends SGs Paging 108 to MME 40 in response to PRN 106 instead of waiting to receive an IAM from GMSC 10. In response, MME 40 sends Paging 110 to UE 50 and returns SGs Service Request 112 to old VMSC 60, which then sends a roaming number to HLR 20 with PRN ACK 114 and also keeps the PRN data. When the user answers the call, the call may fall back to a different VMSC, shown as new VMSC 70 in FIG. 8. In this case, a location update procedure is performed on the new VMSC 70 in step 804. HLR 20 is updated at 810 and sends Cancel Location 812 to old VMSC 60. Then old VMSC 60 stops paging at 816 and sends PRN with the MTRF request indicator to new VMSC 70 at 820. New VMSC 70 handles the MTRF request as explained in U.S. Ser. No. 13/350,918. After old VMSC 60 receives the call from GMSC 110 and MSRN from new VMSC 70, old VMSC 60 routes the call to new VMSC 70 at 830. Old VMSC 70 may receive the Cancel Location from HLR 20 and request MTRF either before or after the call is received from GMSC 10. FIG. 8 depicts the case where old VMSC 70 receives the Cancel Location message after the call is received at 120.

Figure 9:
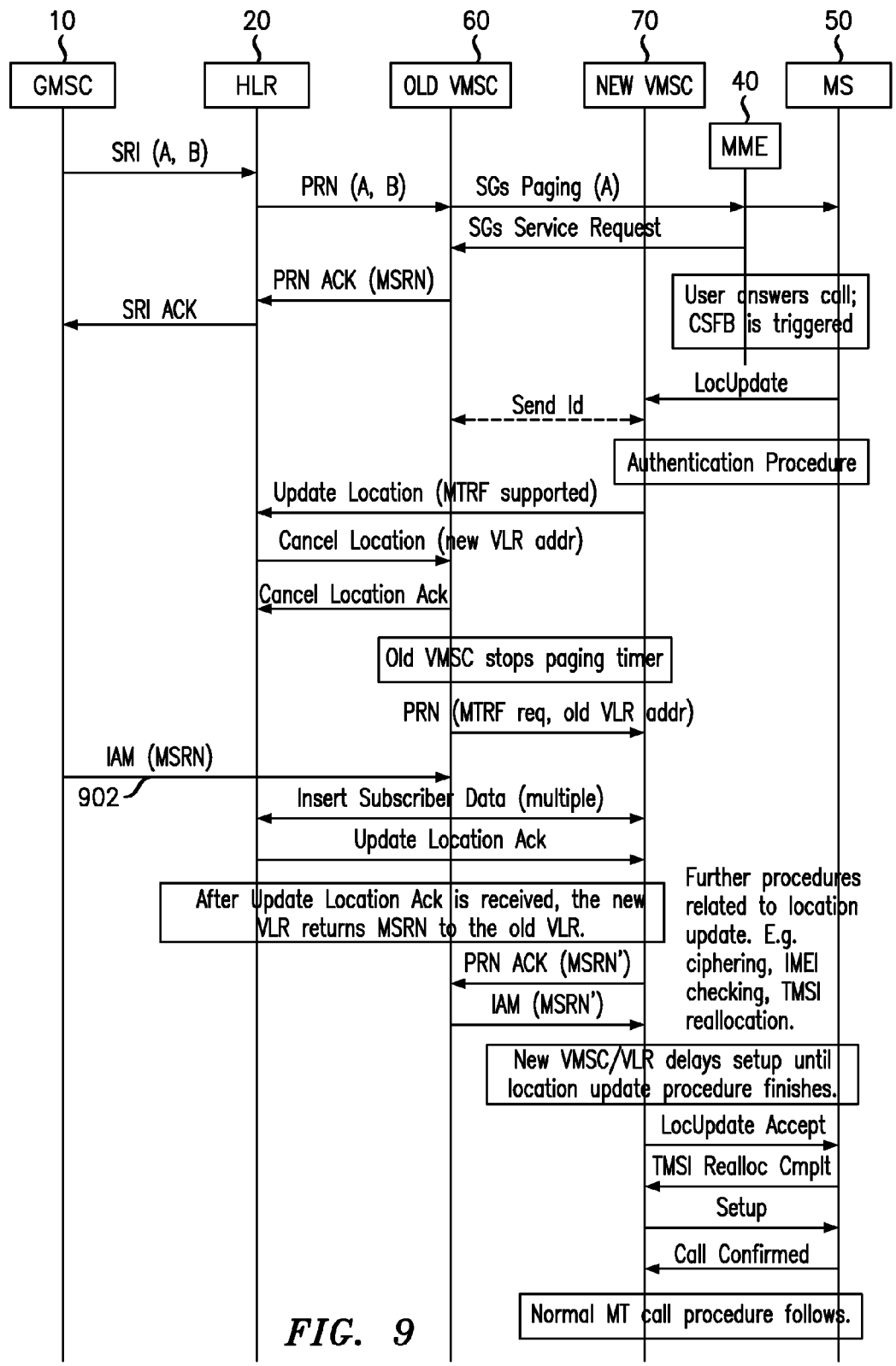
FIG. 9 is a diagram illustrating another embodiment of CSFB during prepaging in a system that uses MTRF when a Cancel Location message is received before the call is received.

The embodiment shown in FIG. 9 is similar to that shown in FIG. 8 but depicts the case where old VMSC 60 receives a cancel location message from HLR 20 before IAM 902 is received from GMSC 10.

In this manner, if the old VMSC 60 has returned a roaming number to HLR 20 and the CS call has reach the old VMSC 60 from GMSC 10, unnecessary routing of the call is avoided if GMSC 10 is far away from old MSC/VLR 60 and the new MSC/VLR 70. Also, the call setup time is reduced if the GMSC 30 is a long distance from the old MSC/VLR 60 and the new MSC/VLR 70.

Figure 10:
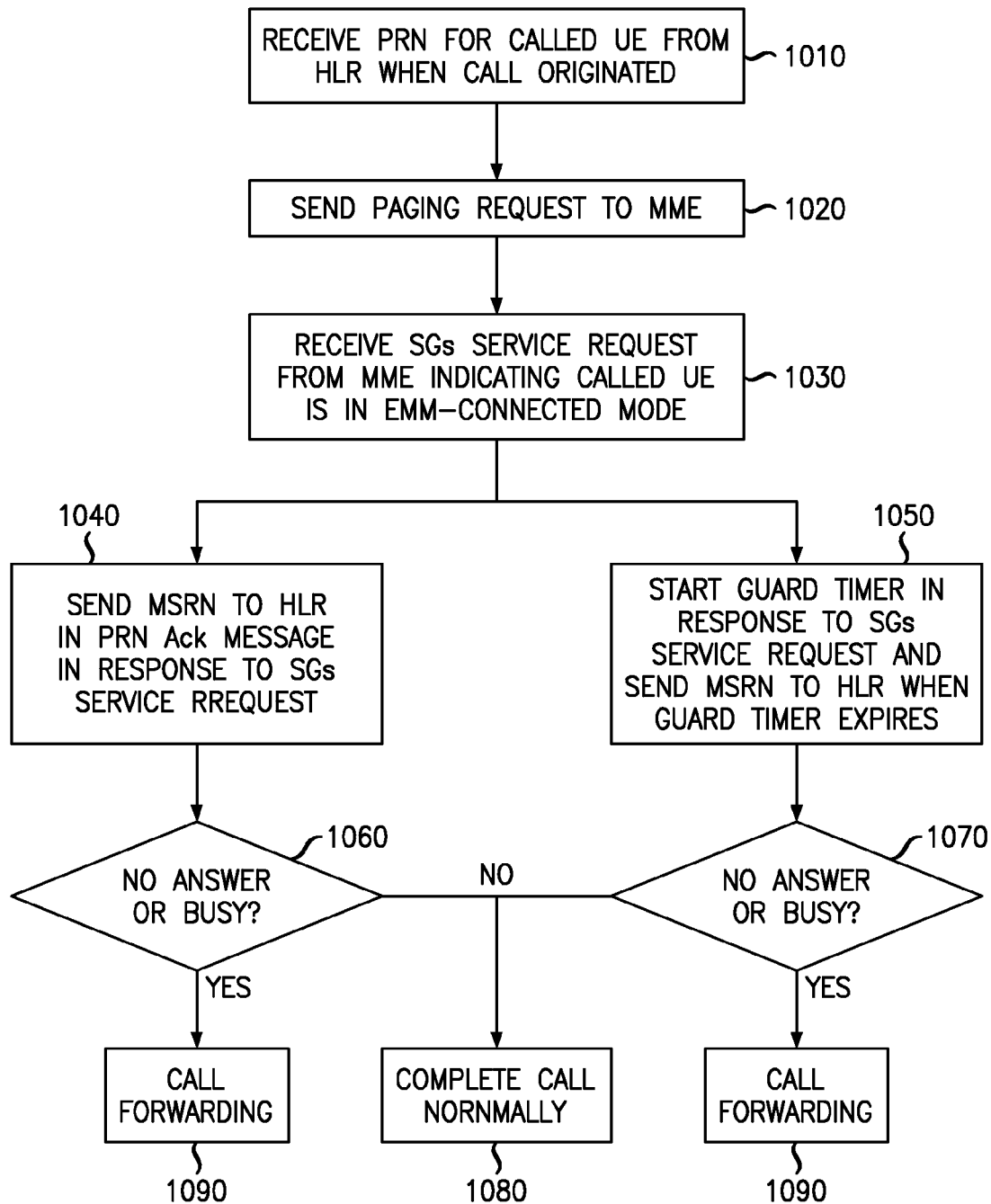
FIG. 10 is a flowchart illustrating . . . .

FIG. 10 is a flowchart illustrating an exemplary process for delivering a mobile terminated call to user equipment according to the above embodiments. When the mobile terminated call is originated, a GMSC sends a SRI message to the HLR, causing the HLR to send a PRN message to a VMSC at 1010. The VMSC then sends a paging request to a MME at 1020. If the UE is in EMM-connected mode, the MME returns a SGs service request to the VMSC at 1030. In response, the VMSC either immediately sends a PRN Ack back to the HLR at 1040, or starts a guard timer and sends the PRN Ack when the guard timer expires at 1050. If the call is answered at 1060 or 1070, normal call processing proceeds at 1080. However, if the UE does not answer or is busy, call forwarding is performed at 1090.

The apparatus in FIG. 11 in one example comprises a plurality of components such as one or more of electronic components, hardware components, and computer software components. A number of such components can be combined or divided in the apparatus. An example component of the apparatus employs and/or comprises a set and/or series of computer instructions written in or implemented with any of a number of programming languages, as will be appreciated by those skilled in the art.

The steps or operations described herein are just for example. There may be many variations to these steps or operations without departing from the spirit of the invention. For instance, the steps may be performed in a differing order, or steps may be added, deleted, or modified.

Although example implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. A method for delivering a mobile terminated call from a calling user equipment (UE) to a called UE over a wireless network, said method comprising the steps of:
    receiving a provide roaming number (PRN) message from a home location register (HLR) associated with the called UE when the mobile terminated call is originated, said PRN message comprising at least a calling UE identification;
    sending a paging request to a mobility management entity (MME) said paging request causing said MME to start paging the called UE;
    receiving a SGs (MSC-MME interfaces) service request message from the MME indicating the called UE is in EMM-connected (Evolved Packet System (EPS) Mobility Management) mode; and
    sending a mobile station roaming number (MSRN) to the HLR in a PRN acknowledge (PRN Ack) message before receiving a response to the paging request from the called UE.

2. The method of claim 1 wherein the PRN Ack message is sent as soon as the paging request is acknowledged by the MME.

3. The method of claim 2 wherein, if the called UE does not answer the call a call forwarding process is initiated as soon as the an Initial Address Message (IAM) is received.

4. The method of claim 2 wherein, if the called UE rejects the paging request, a call forwarding process is initiated as soon as the an IAM is received.

5. The method of claim 1 further comprising the step of setting a guard timer when the SGs service request message from the MME is received and sending the PRN Ack message after the guard timer expires.

6. The method of claim 5 wherein, if the called UE does not answer the call by the time the guard timer expires, a PRN nack ("absent subscriber"/"no answer") message is sent to the HLR and a call forwarding process is initiated.

7. The method of claim 5 wherein, if the called UE rejects the paging request before the guard time expires, a PRN nack ("absent subscriber"/"user busy") message is sent to the HLR and a call forwarding process is initiated.

8. The method of claim 1 wherein called UE is an LTE (Long Term Evolution) device, the mobile terminated call originates from a circuit-switched network and the step of sending a paging request further comprises sending a circuit-switched page to an LTE radio in the mobile device.

9. The method of claim 1 wherein the wireless network includes a mobile termination roaming forwarding feature.

10. A method for providing Circuit Switched Fallback (CSFB) operation during prepaging when delivering a mobile terminated call from a calling 3rd Generation (3G) Circuit Switched (CS) user equipment (UE) to a called Long Term Evolution (LTE) UE, said method comprising the steps of:
   receiving a provide roaming number (PRN) message from a home location register (HLR) associated with the called LTE UE when the mobile terminated call is originated at a gateway mobile switching center (GMSC), said PRN message comprising at least a calling UE identification;
   sending a paging request to a mobility management entity (MME), said paging request causing said MME to start paging the called LTE UE;
   receiving a SGs (MSC-MME interfaces) service request message from the MME; and
   sending a mobile station roaming number (MSRN) to the HLR in a PRN acknowledge (PRN Ack) message before completion of the paging process.

11. The method of claim 10 wherein the PRN Ack message is sent as soon as the paging request is acknowledged by the MME with the SGs service request message, and an initial address message (IAM) is received from the GMSC independently of the completion of the paging process.

12. The method of claim 11 wherein a call forwarding no reply (CFNRy) timer is started in response to the SGs service request message indicating the called LTE UE is in EMM-connected mode (Evolved Packet System (EPS) Mobility Management), and if the called LTE UE does not answer the call before the timer expires, a call forwarding process is initiated as soon as the IAM is received from the GMSC.

13. The method of claim 11 wherein, if the called LTE UE rejects the paging request with a SGs paging reject message, a call forwarding process is initiated as soon as the IAM is received from the GMSC.

14. The method of claim 10 further comprising the steps of setting a guard timer when the SGs service request message from the MME is received and sending the PRN Ack message when the guard timer expires.

15. The method of claim 14 wherein a call forwarding no reply (CFNRy) timer is started in response to the SGs service request message indicating the called LTE UE is in EMM-connected mode, and if the called LTE UE does not answer the call before the CFNRy guard timer expires, a PRN nack ("absent subscriber"/"no answer") message is sent to the HLR and a call forwarding process is initiated.

16. The method of claim 14 wherein, if the called LTE UE rejects the paging request with a SGs paging reject message before the guard time expires, a PRN nack ("absent subscriber"/"user busy") message is sent to the HLR and a call forwarding process is initiated.

17. The method of claim 10 wherein the wireless network includes a mobile termination roaming forwarding feature.

18. An apparatus for use in a telecommunications network for delivering a mobile terminated call from a calling user equipment (UE) to a called UE, said apparatus configured to perform the following steps:
   receiving a provide roaming number (PRN) message from a home location register (HLR) associated with the called UE when the mobile terminated call is originated, said PRN message comprising at least a calling UE identification;
   sending a paging request to a mobility management entity (MME) said paging request causing said MME to start paging the called UE;
   receiving a SGs (MSC-MME interfaces) service request message from the MME; and
   sending a mobile station roaming number (MSRN) to the HLR in a PRN acknowledge (PRN Ack) message before receiving a response to the paging request from the called UE.

19. The apparatus of claim 18 wherein the PRN Ack message is sent as soon as the paging request is acknowledged by the MME.

20. The apparatus of claim 19 wherein, if the called UE does not answer the call or rejects the paging request, a call forwarding process is initiated as soon as an Initial Address Message (IAM) is received.

21. The apparatus of claim 18, the apparatus further configured to perform the step of setting a guard timer when the SGs service request message from the MME is received and sending the PRN Ack message after the guard timer expires.

22. The apparatus of claim 21 wherein, if the called UE does not answer or rejects the call by the time the guard timer expires, a PRN nack message is sent to the HLR and a call forwarding process is initiated.

23. The apparatus of claim 18, said apparatus wherein the called UE is an LTE (Long Term Evolution) device, the calling UE is a Third Generation (3G) device and the sending a paging request step further comprises the step of sending a circuit-switched page to an LTE radio in the called UE.

* * * * *